(12) United States Patent
Lou (10) Patent No.: US 12,526,890 B2
(45) Date of Patent: Jan. 13, 2026

(54) FLOOR LAMP CONTROL CIRCUIT (71) Applicant: Juanjuan Lou, Tianjin (CN)

(72) Inventor: Juanjuan Lou, Tianjin (CN)

( * ) Notice: Subject to any disclaimer, the term of this patent is extended or adjusted under 35 U.S.C. 154(b) by 14 days.

(21) Appl. No.: 18/776,717

(22) Filed: Jul. 18, 2024

(65) Prior Publication Data
US 2024/0414821 A1  Dec. 12, 2024

(30) Foreign Application Priority Data

May 6, 2024 (CN) .......................... 202420954238.7

(51) Int. Cl.
| | | |
|---|---|---|
| *H05B 45/10* | (2020.01) | |
| *H05B 45/20* | (2020.01) | |
| *H05B 45/325* | (2020.01) | |
| *H05B 45/375* | (2020.01) | |
| *H05B 45/39* | (2020.01) | |
| *H05B 47/19* | (2020.01) | |
| *H05B 47/29* | (2020.01) | |

(52) U.S. Cl.
CPC ........... *H05B 45/325* (2020.01); *H05B 45/10* (2020.01); *H05B 45/20* (2020.01); *H05B 45/375* (2020.01); *H05B 45/39* (2020.01); *H05B 47/19* (2020.01); *H05B 47/29* (2020.01)

(58) Field of Classification Search
CPC ...... H05B 45/42; H05B 45/325; H05B 45/10; H05B 45/20; H05B 45/375; H05B 47/19; H05B 47/29
See application file for complete search history.

(56) References Cited

U.S. PATENT DOCUMENTS

| | | | |
|---|---|---|---|
| 2018/0139824 A1* | 5/2018 | Lin | F21V 23/001 |
| 2020/0389955 A1* | 12/2020 | Price | H05B 45/44 |
| 2024/0077192 A1* | 3/2024 | Choy | F21V 21/005 |

* cited by examiner

*Primary Examiner* — Renan Luque
(74) *Attorney, Agent, or Firm* — Daniel M. Cohn; Howard M. Cohn (57) ABSTRACT

The present utility model discloses a floor lamp control circuit, which comprises a central processing unit (CPU), a 12-36V isolation adapter, a DC-DC step-down circuit and an H-bridge control LED brightness & color temperature circuit; the input end of the 12-36V isolation adapter is connected to the mains supply, the output end of the 12-36V isolation adapter is connected to the input end of the DC-DC step-down circuit, and the output end of the DC-DC step-down circuit is connected to the CPU; the two PWM control ports of the CPU are connected to the two PWM ports of the H-bridge control LED brightness & color temperature circuit, and the conduction of the H-bridge control LED brightness & color temperature circuit is controlled through two PWM control ports; the output end of the LED brightness & color temperature circuit is connected in parallel with more than one LED lamp array. The circuit of this structure can help to improve the safety.

2 Claims, 7 Drawing Sheets

FLOOR LAMP CONTROL CIRCUIT

TECHNICAL FIELD

The present utility model relates to the LED lamp circuit control technology, particularly to a floor lamp control circuit.

BACKGROUND ART

Generally, for floor lamps on the market, LED bulbs with an AC input of 100-220V are directly installed in their holders; the lamp holders themselves are used under a high voltage, and people may touch the high-voltage part during installation or use of bulbs, causing fatal injuries, and therefore, an improvement is needed.

CONTENT OF THE UTILITY MODEL

The present utility model is intended for providing a floor lamp control circuit to solve the issues regarding installation risks in existing floor lamps.

To solve the above technical issues, the present utility model is achieved through the following technical solution:

The present utility model discloses a floor lamp control circuit, which comprises a central processing unit (CPU), a 12-36V isolation adapter, a DC-DC step-down circuit and an H-bridge control LED brightness & color temperature circuit; the input end of the 12-36V isolation adapter is connected to the mains supply, the output end of the 12-36V isolation adapter is connected to the input end of the DC-DC step-down circuit, and the output end of the DC-DC step-down circuit is connected to the CPU; the two PWM control ports of the CPU are connected to the two PWM ports of the H-bridge control LED brightness & color temperature circuit, and the conduction of the H-bridge control LED brightness & color temperature circuit is controlled through two PWM control ports; the output end of the LED brightness & color temperature circuit is connected in parallel with more than one LED lamp array 5;

Preferably, the H-bridge control LED brightness & color temperature circuit comprises a +24V VCC, a first NPN transistor Q1, a second PNP transistor Q2, a third NPN transistor Q3, a fourth PNP transistor Q4, a first P-channel field effect transistor P1, a second N-channel field effect transistor P2, a third P-channel field effect transistor P3, a fourth N-channel field effect transistor P4, a fifth N-channel field effect transistor P5 and a sixth N-channel field effect transistor P6; the S-pin of the sixth N-channel field effect transistor P6 is connected to the ground terminal GND; one G-pin end of the sixth N-channel field effect transistor P6 is connected to a third resistor R3, and the other end of the third resistor R3 serves as a PWM interface II and is connected to a PWM control port of the CPU; the D-pin of the sixth N-channel field effect transistor P6 is connected to the base of the second PNP transistor Q2 through a second resistor R2, and the collector of the second PNP transistor Q2 is connected to the ground terminal GND through a fourth resistor R4; the emitter of the second PNP transistor Q2 is connected to that of the first NPN transistor Q1, and the base of the first NPN transistor Q1 is connected to that of the second PNP transistor Q2; the collector of the first NPN transistor Q1 is connected to the +24 V VCC, and the +24 V VCC is connected to the G-pin of the first P-channel field effect transistor P1 through a fifteenth resistor R15; the G-pin of the first P-channel field effect transistor P1 is also connected to the emitter of the second PNP transistor Q2 through a sixteenth resistor R16; the S-pin of the first P-channel field effect transistor P1 is connected to the +24 V VCC, the D-pin of the first P-channel field effect transistor P1 is connected to that of the second N-channel field effect transistor P2 and serves as a solder pad interface A; the S-pin of the second N-channel field effect transistor P2 is connected to the ground terminal GND, the G-pin of the second N-channel field effect transistor P2 is connected to one end of the a fifth resistor R5, and the other end of the fifth resistor R5 serves as a PWM interface I and is connected to another PWM control port of the CPU;

The S-pin of the fifth N-channel field effect transistor P5 is connected to the ground terminal GND, one G-pin end of the fifth N-channel field effect transistor P5 is connected to a fourteenth resistor R14, and the other end of the fourteenth resistor R14 serves as a PWM interface I and is connected to a PWM control port of the CPU 1; the D-pin of the fifth N-channel field effect transistor P5 is connected to the base of the fourth PNP transistor Q4 through a twelfth resistor R12, the collector of the fourth PNP transistor Q4 is connected to the ground terminal GND through a seventeenth resistor R17, and the emitter of the fourth PNP transistor Q4 is connected to that of the third NPN transistor Q3; the base of the third NPN transistor Q3 is connected to that of the fourth PNP transistor Q4, the collector of the third NPN transistor Q3 is connected to the +24V VCC, and the +24V VCC is connected to the G-pin of the third P-channel field effect transistor P3 through a tenth resistor R10; the G-pin of the third P-channel field effect transistor P3 is also connected to the emitter of the fourth PNP transistor Q4 through an eleventh resistor R11, the S-pin of the third P-channel field effect transistor P3 is connected to the +24V VCC, the D-pin of the third P-channel field effect transistor P3 is connected to that of the fourth N-channel field effect transistor P4 and serves as a solder pad interface B; the S-pin of the fourth N-channel field effect transistor P4 is connected to the ground terminal GND; the G-pin of the fourth N-channel field effect transistor P4 is connected to one end of an eighth resistor R8, and the other end of the eighth resistor R8 serves as a PWM interface II and is connected to another PWM control port of the CPU 1.

Preferably, a first resistor R1 is connected between the base of the second PNP transistor Q2 and the collector of the first NPN transistor Q1, a sixth resistor R6 is connected between the G-pin and S-pin of the second N-channel field effect transistor P2, a twelfth resistor R12 is connected between the base of the fourth PNP transistor Q4 and the collector of the third NPN transistor Q3, and a ninth resistor R9 is connected between the G-pin and S-pin of the fourth N-channel field effect transistor P4.

Preferably, the CPU is also electrically connected to a touch key control interface.

Preferably, the CPU is also electrically connected to a 2.4 G RF remote control signal terminal.

Preferably, the CPU is also electrically connected to a mobile phone Bluetooth signal terminal.

The present utility model has the following beneficial effects: a control board being controlled by 2 wires can be installed with multiple styles of low-voltage bulbs in later stages; the 2 wires (namely the solder pad interface B and A) can be connected to the threaded sockets of the low-voltage bulbs through the control board to control the color temperature and brightness of the bulbs; the entire circuit uses a 12-36V isolation adapter DC power supply, making the control board and bulbs be used at a safe voltage; no any high-voltage electric shock will be caused when using at the user end, and the installation method is the same as that for common high-voltage bulbs.

BRIEF DESCRIPTION OF DRAWINGS

FIG. 7 shows a bulb connection diagram.
Drawing marks: CPU 1, 12-36V isolation adapter 2, DC-DC step-down circuit 3, H-bridge control LED brightness & color temperature circuit 4, LED lamp array 5, touch key control interface 6, 2.4 G RF remote control signal terminal 7, mobile phone Bluetooth signal terminal 8.

DETAILED DESCRIPTION OF THE PREFERRED EMBODIMENTS

In order to clarify the purpose, technical solution and advantages of the embodiments of the present utility model, the technical solution in the embodiments of the utility model will be clearly and completely described below based on the embodiments of the present utility model. Obviously, the described items are only a part of the embodiments of the utility model. Based on the embodiments of the present utility model, all other embodiments obtained by common technicians in the art without making creative labor shall fall within the protection of the present utility model.

Embodiment 1

Figure 1:
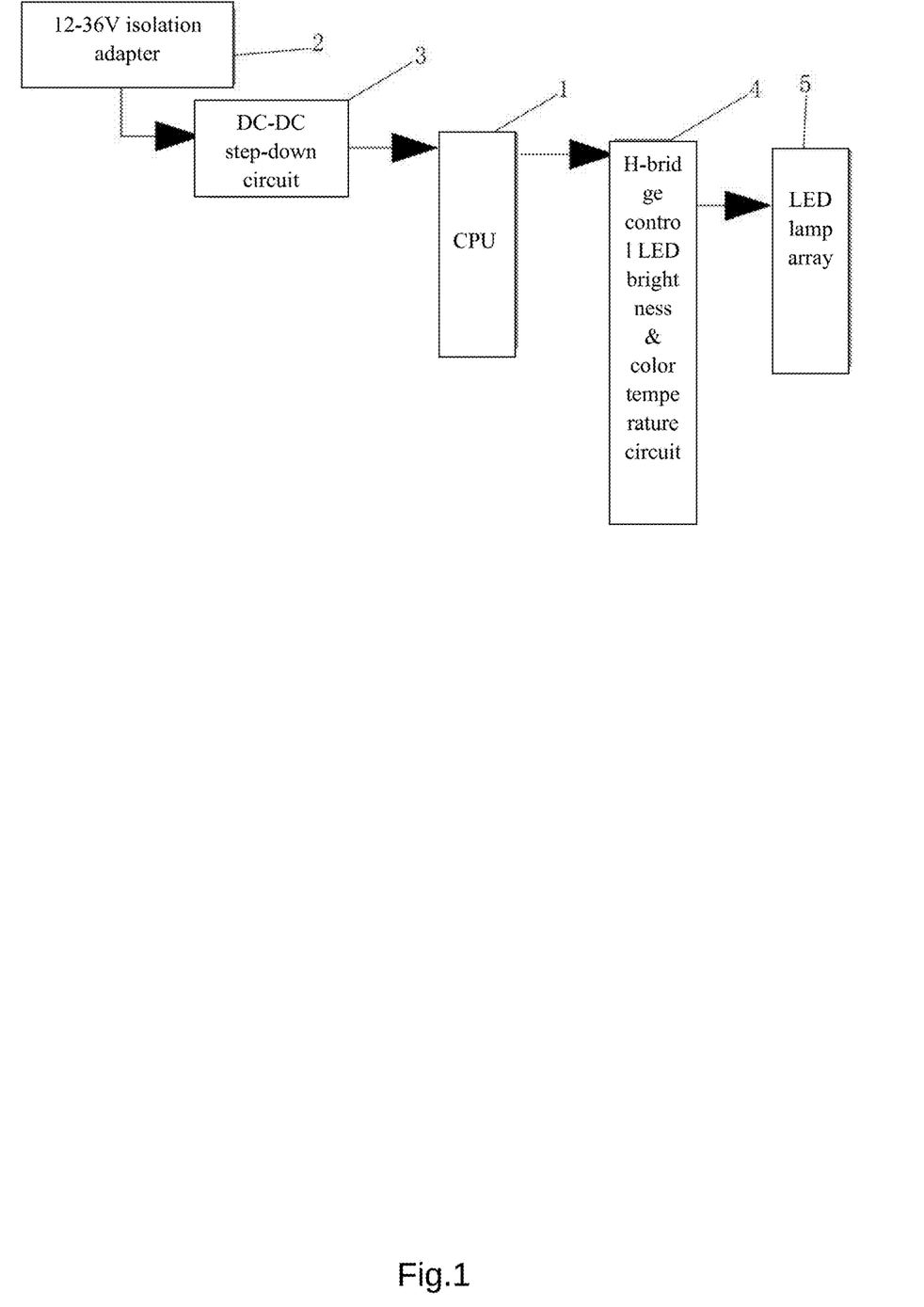
FIG. 1 shows a functional block diagram of the floor lamp control circuit described in Embodiment 1.
Figure 2:
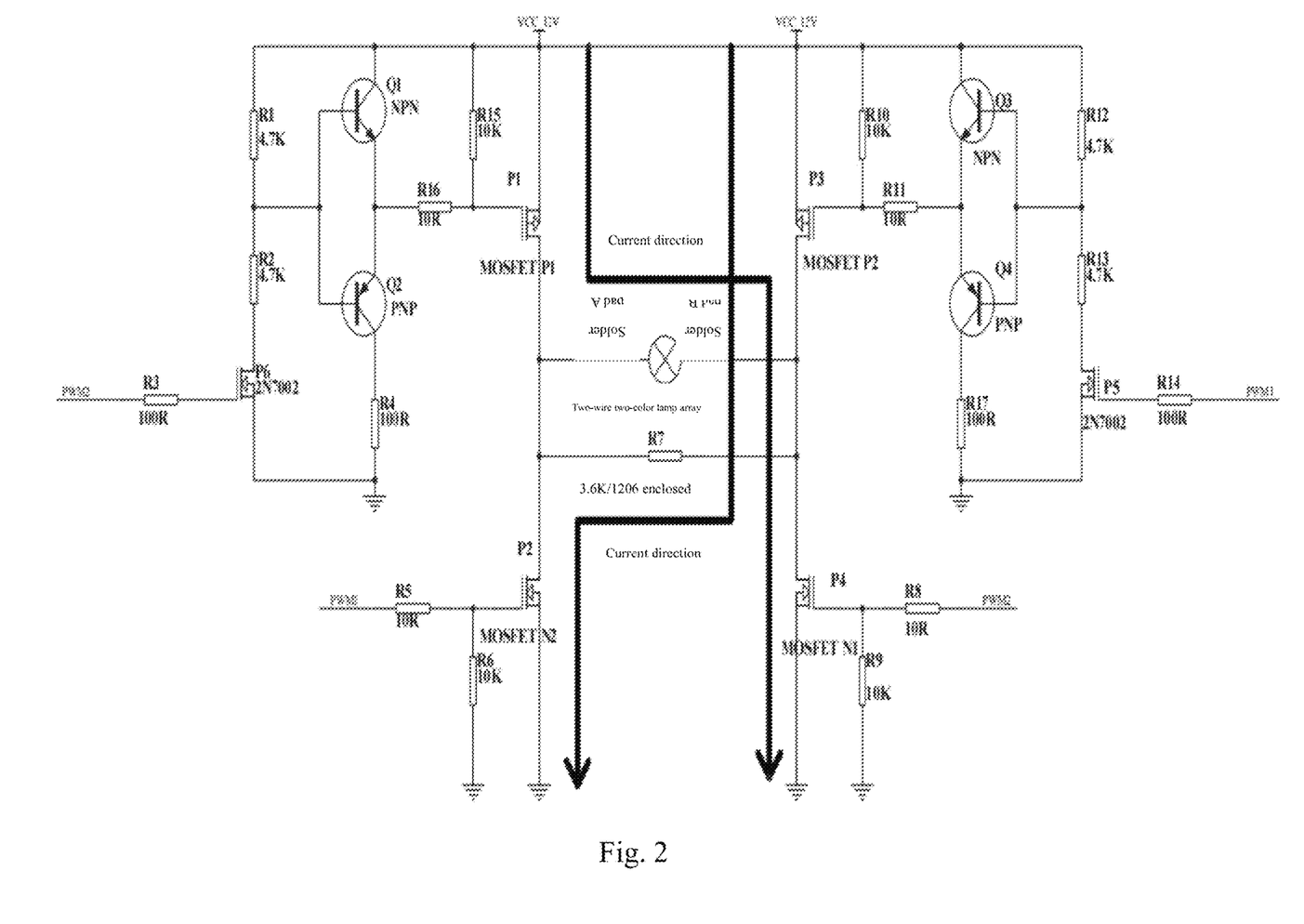
FIG. 2 shows a schematic diagram of the H-bridge control LED brightness & color temperature circuit described in Embodiment 1.

As shown in FIG. 1-2, the present utility model discloses a floor lamp control circuit, which comprises a CPU 1, a 12-36V isolation adapter 2, a DC-DC step-down circuit 3 and an H-bridge control LED brightness & color temperature circuit 4; the input end of the 12-36V isolation adapter 2 is connected to the mains supply, the output end of the 12-36V isolation adapter 2 is connected to the input end of the DC-DC step-down circuit 3, and the output end of the DC-DC step-down circuit 3 is connected to the CPU 1; the two PWM control ports of the CPU 1 are connected to the two PWM ports of the H-bridge control LED brightness & color temperature circuit 4, and the conduction of the H-bridge control LED brightness & color temperature circuit 4 is controlled through two PWM control ports. The advantages of the DC-DC step-down circuit 3 used for this structure are that it has a high step-down efficiency, almost no temperature rise is caused by the corresponding LDO step-down, so the step-down result can reach up to 5V and then to 3.3V through LDO, and moreover, components DPS908, XN297LBW and TM1650 can be all powered here.

Preferably, the H-bridge control LED brightness & color temperature circuit comprises a +24V VCC, a first NPN transistor Q1, a second PNP transistor Q2, a third NPN transistor Q3, a fourth PNP transistor Q4, a first P-channel field effect transistor P1, a second N-channel field effect transistor P2, a third P-channel field effect transistor P3, a fourth N-channel field effect transistor P4, a fifth N-channel field effect transistor P5 and a sixth N-channel field effect transistor P6; the S-pin of the sixth N-channel field effect transistor P6 is connected to the ground terminal GND; one G-pin end of the sixth N-channel field effect transistor P6 is connected to a third resistor R3, and the other end of the third resistor R3 serves as a PWM interface II and is connected to a PWM control port of the CPU; the D-pin of the sixth N-channel field effect transistor P6 is connected to the base of the second PNP transistor Q2 through a second resistor R2, and the collector of the second PNP transistor Q2 is connected to the ground terminal GND through a fourth resistor R4; the emitter of the second PNP transistor Q2 is connected to that of the first NPN transistor Q1, and the base of the first NPN transistor Q1 is connected to that of the second PNP transistor Q2; the collector of the first NPN transistor Q1 is connected to the +24V VCC, and the +24V VCC is connected to the G-pin of the first P-channel field effect transistor P1 through a fifteenth resistor R15; the G-pin of the first P-channel field effect transistor P1 is also connected to the emitter of the second PNP transistor Q2 through a sixteenth resistor R16; the S-pin of the first P-channel field effect transistor P1 is connected to the +24V VCC, the D-pin of the first P-channel field effect transistor P1 is connected to that of the second N-channel field effect transistor P2 and serves as a solder pad interface A; the S-pin of the second N-channel field effect transistor P2 is connected to the ground terminal GND, the G-pin of the second N-channel field effect transistor P2 is connected to one end of the a fifth resistor R5, and the other end of the fifth resistor R5 serves as a PWM interface I and is connected to another PWM control port of the CPU;

The S-pin of the fifth N-channel field effect transistor P5 is connected to the ground terminal GND, one G-pin end of the fifth N-channel field effect transistor P5 is connected to a fourteenth resistor R14, and the other end of the fourteenth resistor R14 serves as a PWM interface I and is connected to a PWM control port of the CPU 1; the D-pin of the fifth N-channel field effect transistor P5 is connected to the base of the fourth PNP transistor Q4 through a twelfth resistor R12, the collector of the fourth PNP transistor Q4 is connected to the ground terminal GND through a seventeenth resistor R17, and the emitter of the fourth PNP transistor Q4 is connected to that of the third NPN transistor Q3; the base of the third NPN transistor Q3 is connected to that of the fourth PNP transistor Q4, the collector of the third NPN transistor Q3 is connected to the +24V VCC, and the +24V VCC is connected to the G-pin of the third P-channel field effect transistor P3 through a tenth resistor R10; the G-pin of the third P-channel field effect transistor P3 is also connected to the emitter of the fourth PNP transistor Q4 through an eleventh resistor R11, the S-pin of the third P-channel field effect transistor P3 is connected to the +24V VCC, the D-pin of the third P-channel field effect transistor P3 is connected to that of the fourth N-channel field effect transistor P4 and serves as a solder pad interface B; the S-pin of the fourth N-channel field effect transistor P4 is connected to the ground terminal GND; the G-pin of the fourth N-channel field effect transistor P4 is connected to one end of an eighth resistor R8, and the other end of the eighth resistor R8 serves as a PWM interface II and is connected to another PWM control port of the CPU 1.

Preferably, a first resistor R1 is connected between the base of the second PNP transistor Q2 and the collector of the first NPN transistor Q1, a sixth resistor R6 is connected between the G-pin and S-pin of the second N-channel field effect transistor P2, a twelfth resistor R12 is connected between the base of the fourth PNP transistor Q4 and the collector of the third NPN transistor Q3, and a ninth resistor R9 is connected between the G-pin and S-pin of the fourth N-channel field effect transistor P4.

For this structure, the conduction of the H-bridge control LED brightness & color temperature circuit 4 is controlled through the two PWM ports of the CPU; the H-bridge control LED brightness & color temperature circuit 4 is subject to a high timing requirement, so a complementary PWM method is adopted for the board structure for control; at any time point, the current only goes in the direction of route ① or route ② rather than in both directions at the same time; otherwise, the MOS transistor will be burnt out; in order to improve the conduction of P1 and P2, a fast switching MOS transistor 2N7002 is used; in order to enhance the conduction of P1 and P2, a push-pull circuit composed of a combination of NPN and PNP is used, so that MOS P1 and P2 will not cause burning out of MOS under a PWM time overlap generated through PWM waveform deformation due to junction capacitance issues; in addition, a time control for timing is strengthened during software design to ensure that the entire circuit works in the best and safest conditions!

Figure 7:
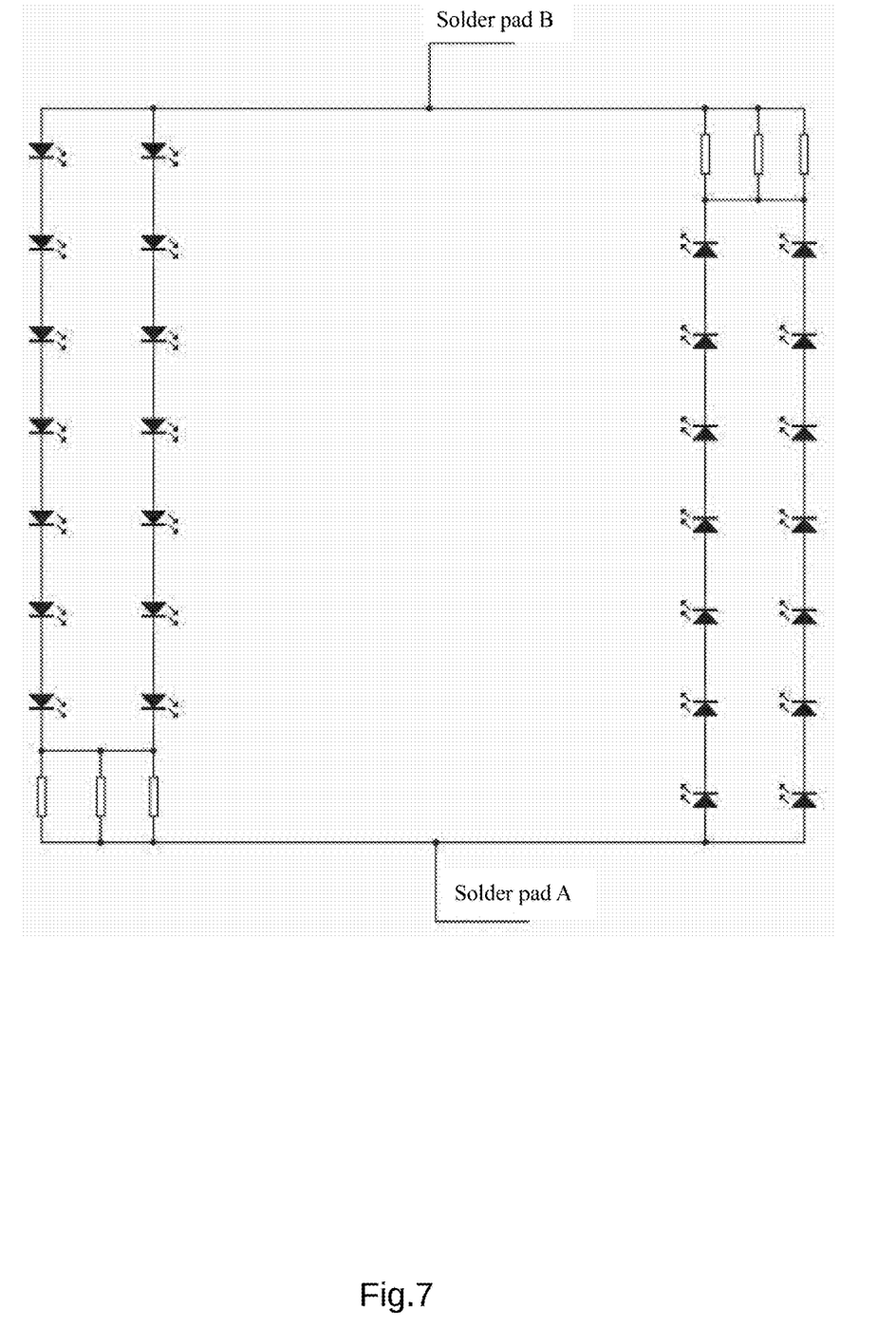

The advantages of this structure are that a control board being controlled by 2 wires can be installed with multiple styles of low-voltage bulbs in later stages; the 2 wires (namely the solder pad interface B and A) can be connected to the threaded sockets of the low-voltage bulbs through the control board to control the color temperature and brightness of the bulbs; the entire circuit uses a 12-36V isolation adapter DC power supply, making the control board and bulbs be used at a safe voltage; no any high-voltage electric shock will be caused when using at the user end, and the installation method is the same as that for common high-voltage bulbs; according to the bulb connection between the solder pad interface B and A as shown in FIG. 7, with the increase and decrease of wattage in later stages, the number of parallel circuits will increase or decrease; this can be applied to various bulbs, as long as the circuit principle on the lamp board is the same.

This structure mainly relates to the low-voltage two-wire control, 2.4 G wireless, and touch control technologies; overall, it includes a low-voltage adapter power supply and a sliding bar board; the H-bridge control board relates to a floor lamp control circuit according to the present application; a low-voltage plug is set at the bottom of the entire lamp, which can be directly inserted into the DC socket of the lamp to be used for power supply to the entire system; generally, for floor lamps on the market, LED bulbs with an AC input of 100-220V are directly installed in their holders; the lamp holders themselves are used under a high voltage, and people may touch the high-voltage part during installation or use of bulbs, causing fatal injuries and therefore, on this structure, further more styles of low-voltage bulbs are designed relying on a two-wire controlled control board; the 2 wires can be connected to the threaded sockets of the low-voltage bulbs through the control board to control the color temperature and brightness of the bulbs; the floor lamp control circuit according to the present application uses a 12-36V isolation adapter DC power supply, making the control board and bulbs be used at a safe voltage; no any high-voltage electric shock will be caused when using at the user end, and the installation method is the same as that for common high-voltage bulbs; the circuit is integratedly designed to ensure a simpler arrangement and a more convenient installation.

Figure 6:
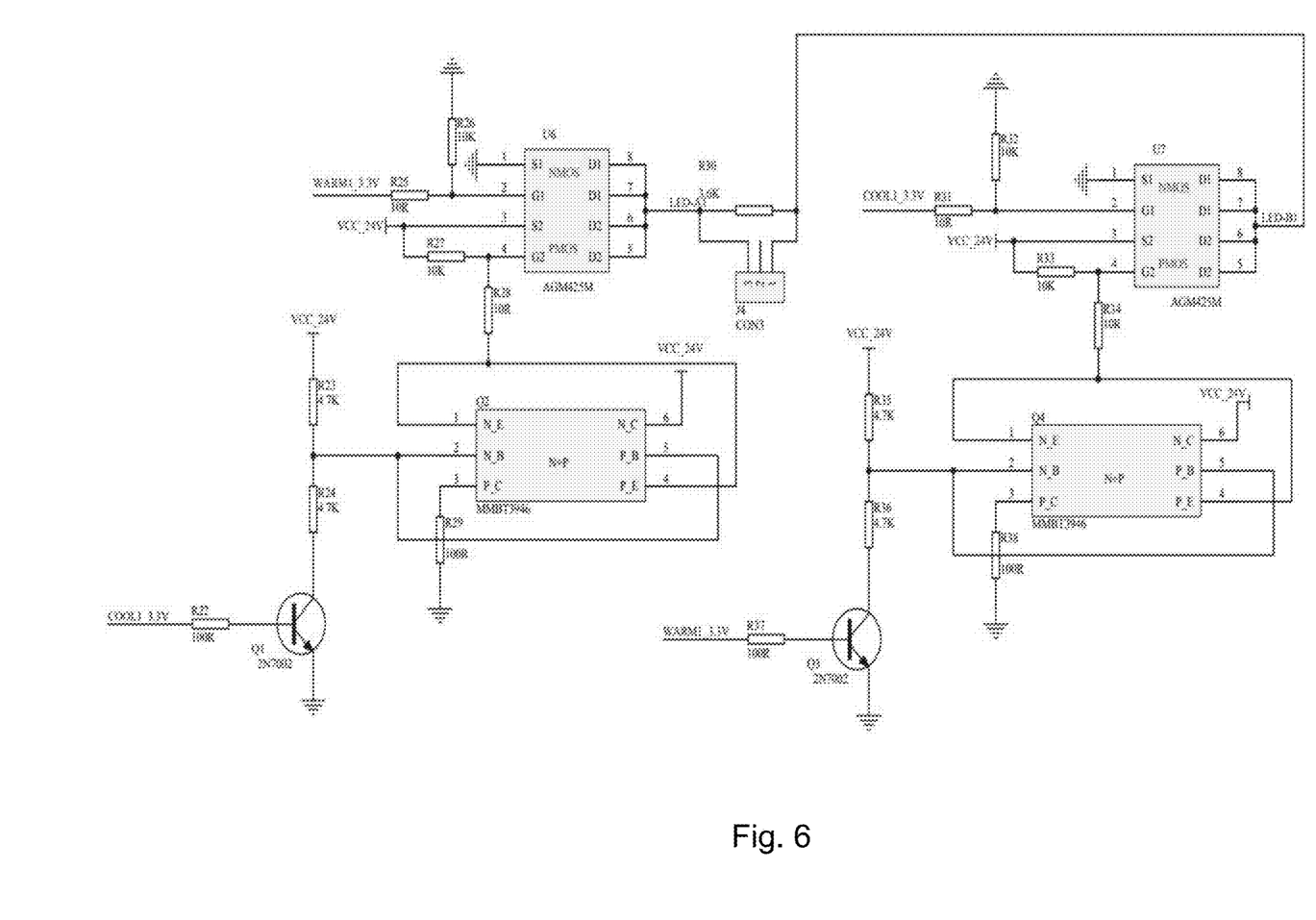
FIG. 6 shows a circuit structure diagram when integrating several components of the circuit together.

In order to reduce the size of the PCB in the present application, as shown in the figure, the discrete components are integrated, and transistors Q1 and Q2 are replaced with SOT23-6 enclosed MMBT3946 products; MMBT3946 is a chip that integrates N and P transistors; for Q3 and Q4, the operation is the same, P1 and P2 are replaced with SOP8 enclosed AGM425M products; AGM425 is a chip that integrates N-MOS and P-MOS transistors; similarly, for P3 and P4, the operation is the same, such integration design is adopted throughout the entire control board, making the circuit extremely simple and compact, see the final circuit in FIG. 6.

Embodiment 2

Figure 3:
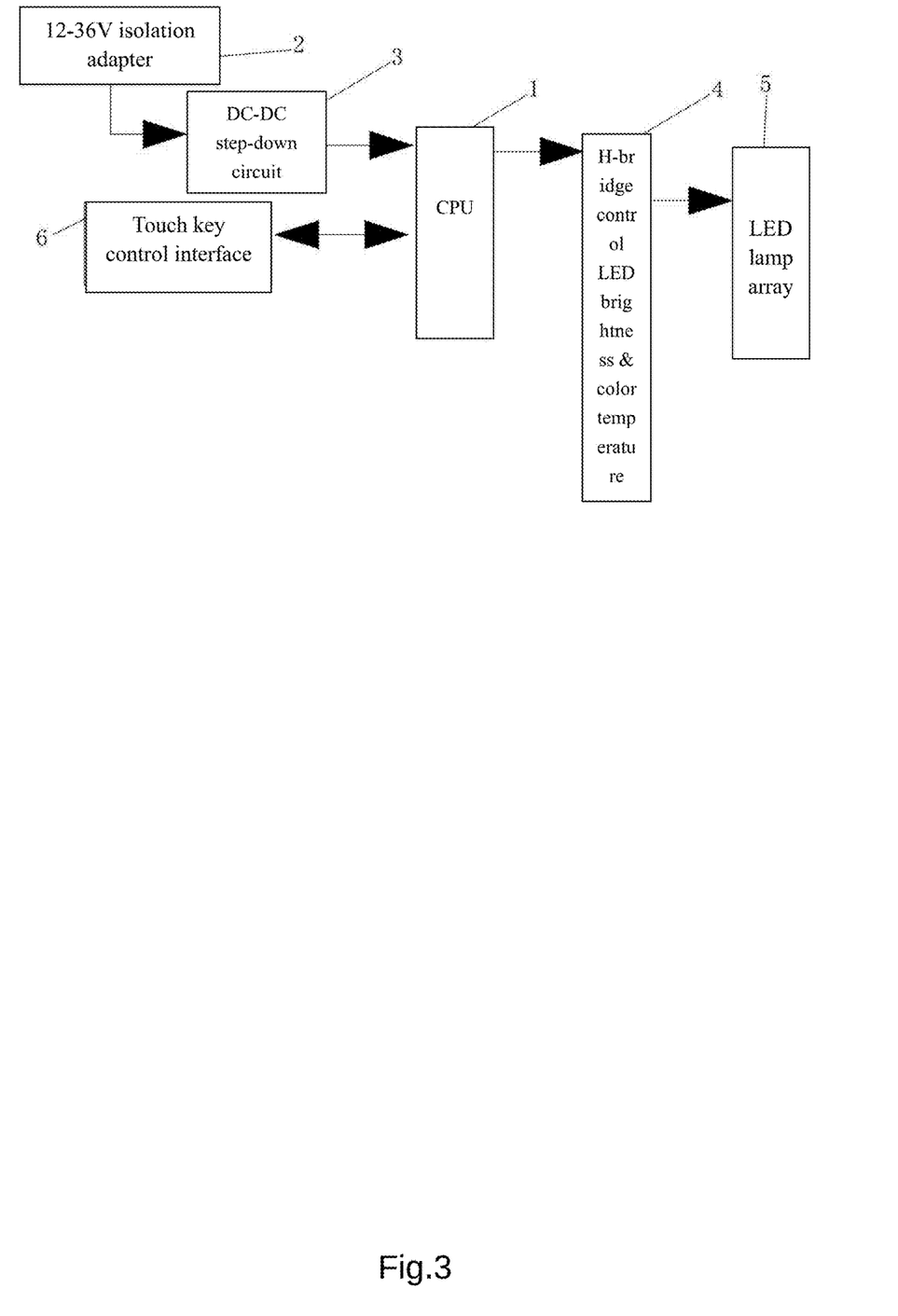
FIG. 3 shows a functional block diagram of the floor lamp control circuit described in Embodiment 2.

As shown in FIG. 3, the rough structure of the floor lamp control circuit disclosed in this embodiment is the same as that in Embodiment 1; however, as a preferred embodiment, the CPU 1 is also electrically connected to a touch key control interface 6; by setting the touch key control interface 6, touch control will be enabled after a touch switch is connected.

Embodiment 3

Figure 4:
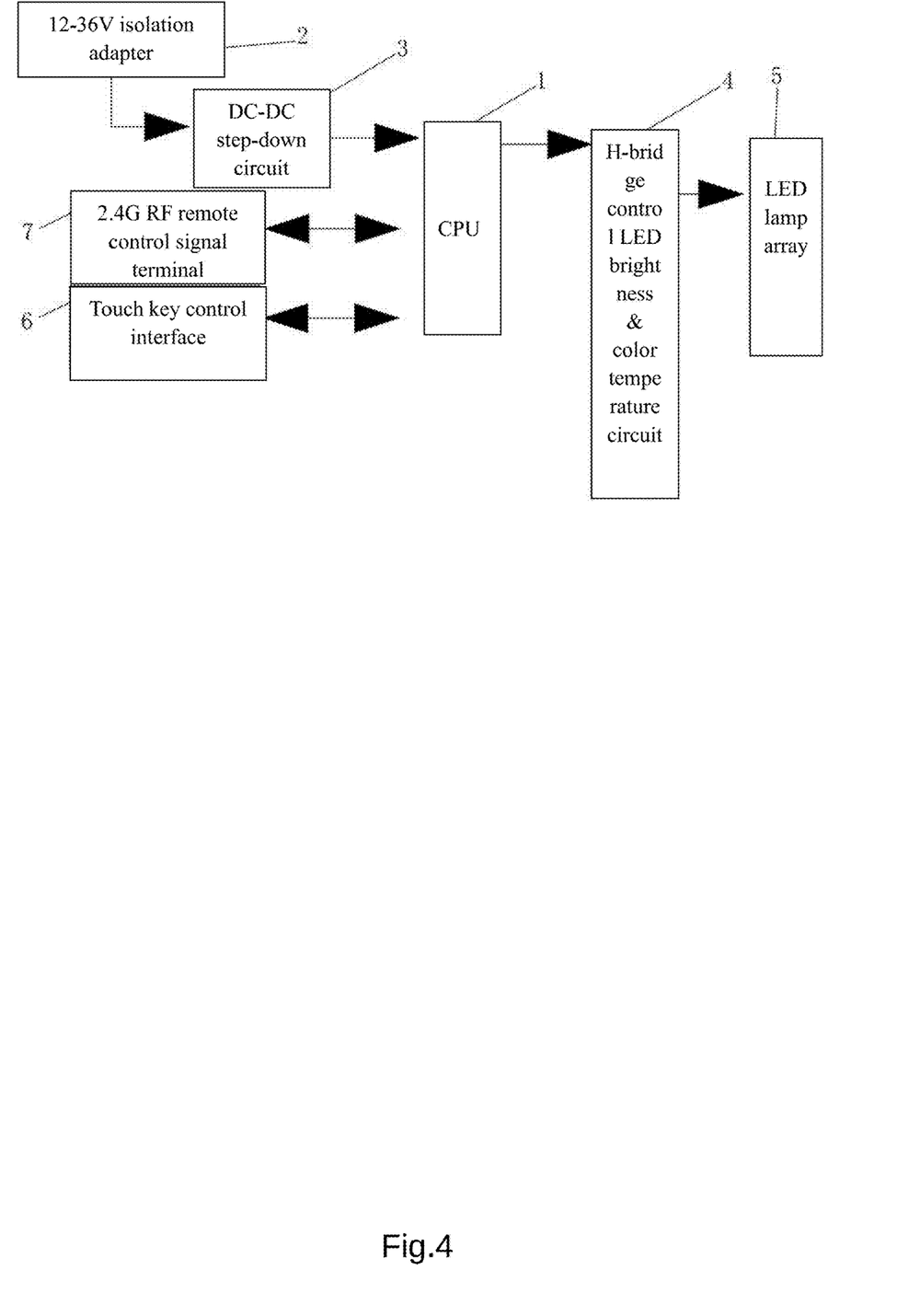
FIG. 4 shows a functional block diagram of the floor lamp control circuit described in Embodiment 3.

As shown in FIG. 4, the rough structure of the floor lamp control circuit disclosed in this embodiment is the same as that in Embodiment 2; however, as a preferred embodiment, the CPU 1 is also electrically connected to a 2.4 G RF remote control signal terminal 7; by setting the 2.4 G RF remote control signal terminal 7, remote control will be enabled.

Embodiment 4

Figure 5:
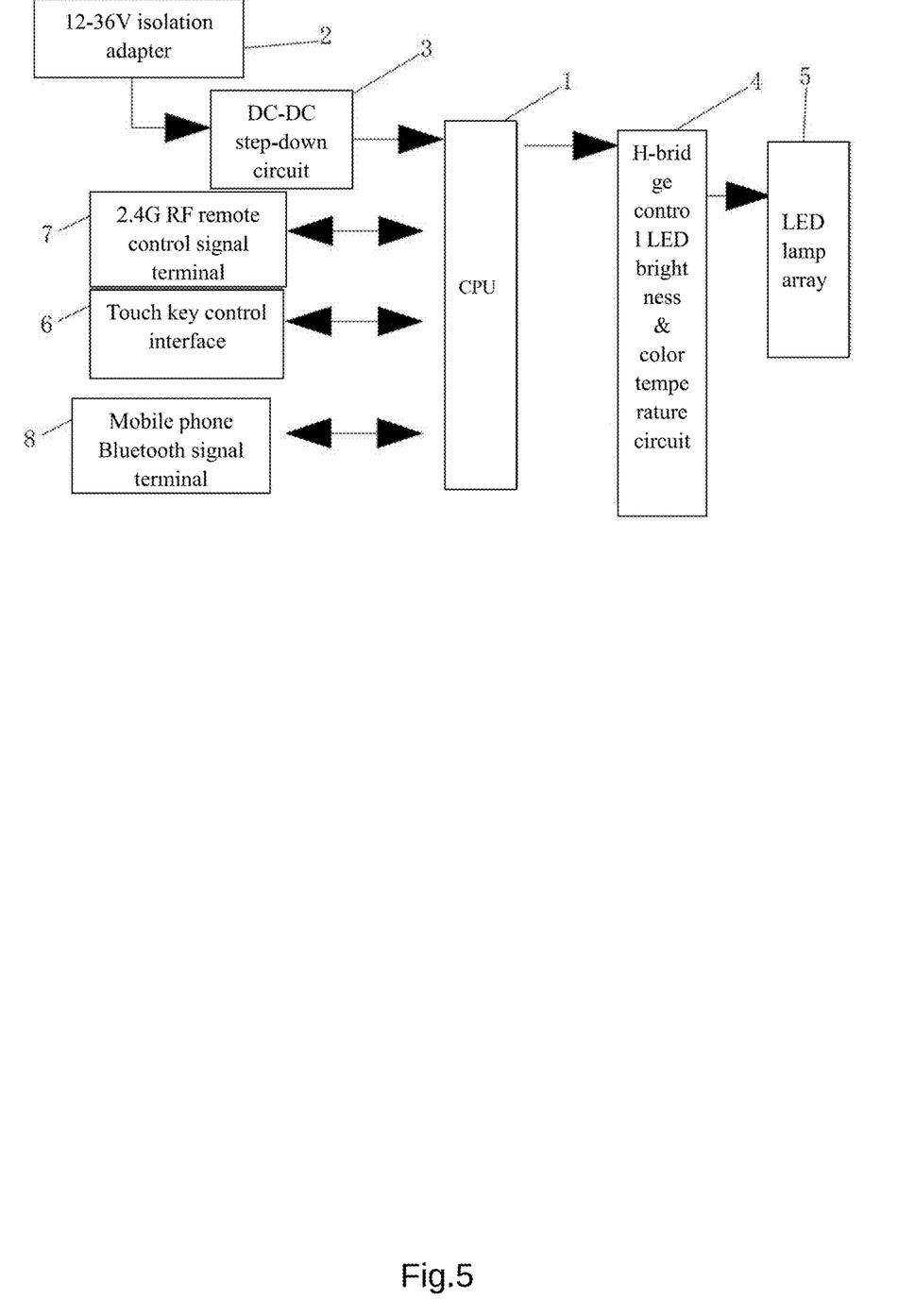
FIG. 5 shows a functional block diagram of the floor lamp control circuit described in Embodiment 4.

As shown in FIG. 5, the rough structure of the floor lamp control circuit disclosed in this embodiment is the same as that in Embodiment 3; however, as a preferred embodiment, the CPU 1 is also electrically connected to a mobile phone Bluetooth signal terminal 8; by setting the a mobile phone Bluetooth signal terminal 8, remote control by a mobile phone will be enabled.

The present application is mainly intended for solving the following issues regarding the prior art:
1. The commonly used threaded socket bulbs on the market are usually high-voltage AC100V~245V products, so when installing them, the threaded sockets are at a high voltage; if users touch their metal parts, they will get an electric shock, and therefore, low-voltage floor lamp bulbs are used instead;
2. A typical circuit for controlling the brightness and color temperature of a lamp array requires one common anode and two negative electrodes, so a 3-wire configuration is needed; however, a threaded socket for a bulb has only two contact points and two wires; therefore, the bulb is designed to have two different color temperatures (connections in series and parallel allowed); the positive and negative electrodes of lamp beads are connected to each other. Detailed description: the negative electrode of an A color temperature lamp string is connected to the positive electrode of a B color temperature lamp string to form a threaded socket contact point, while the positive electrode of the A color temperature lamp string is connected to the negative electrode of the B color temperature lamp string to form a threaded socket contact point, so on threaded socket bulb needs two wires;

3. How to control a two-wire two-color bulb on Contact Point 2 through the two wires of the control board and how to make this circuit smaller and safer are dependent on our software and hardware technologies, therefore, the H-bridge control LED brightness & color temperature circuit 4 mentioned in the present application is considered as the control core.

Therefore, the present application has the following advantages: 1: It solves the issue of using high-voltage bulbs in the floor lamp industry, and our low-voltage two-wire two-color bulbs should be the first to be applied in the floor lamp industry;

2: Although the two-wire two-color H-bridge control circuit is also used for other lighting fixtures, it is innovative to transform it into bulbs in the floor lamp industry, which is the purpose of the patent and also the scope we need to protect; use of this design and the H-bridge control two-wire two-color low-voltage bulbs by unauthorized competitors are not allowed in the floor lamp industry;

3. The LED brightness & color temperature circuit 4 will be controlled through sliding bars, remote controls and mobile phone apps.

The above are only preferred embodiments of the present utility model and not intended for limiting the present utility model. Any modifications to the technical solution recorded in the above mentioned embodiments, equivalent substitutions of some technical features, and any modifications, equivalent substitutions or improvements made shall fall within the protection of the present utility model.

What it claimed is:

1. A floor lamp control circuit, comprising a central processing unit (CPU) (1); a 12-36V isolation adapter (2); a DC-DC step-down circuit (3); and an H-bridge control LED brightness and color temperature circuit (4); wherein the input end of the 12-36V isolation adapter (2) is connected to the mains supply, the output end of the 12-36V isolation adapter (2) is connected to the input end of the DC-DC step-down circuit (3), the output end of the DC-DC step-down circuit (3) is connected to the CPU (1); the two PWM control ports of the CPU (1) are connected to the two PWM ports of the H-bridge control LED brightness and color temperature circuit (4) respectively; and the conduction of the H-bridge control LED brightness and color temperature circuit (4) is controlled through two PWM control ports; the output end of the LED brightness and color temperature circuit (4) is connected in parallel with a plurality of LED lamp arrays (5); the H-bridge control LED brightness and color temperature circuit (4) comprises a +24V VCC, a first NPN transistor Q1, a second PNP transistor Q2, a third NPN transistor Q3, a fourth PNP transistor Q4, a first P-channel field effect transistor P1, a second N-channel field effect transistor P2, a third P-channel field effect transistor P3, a fourth N-channel field effect transistor P4, a fifth N-channel field effect transistor P5 and a sixth N-channel field effect transistor P6; the S-pin of the sixth N-channel field effect transistor P6 is connected to the ground terminal GND; one G-pin end of the sixth N-channel field effect transistor P6 is connected to a third resistor R3, and the other end of the third resistor R3 serves as a PWM interface II and is connected to a PWM control port of the CPU (1); the D-pin of the sixth N-channel field effect transistor P6 is connected to the base of the second PNP transistor Q2 through a second resistor R2, and the collector of the second PNP transistor Q2 is connected to the ground terminal GND through a fourth resistor R4; the emitter of the second PNP transistor Q2 is connected to that of the first NPN transistor Q1, and the base of the first NPN transistor Q1 is connected to that of the second PNP transistor Q2; the collector of the first NPN transistor Q1 is connected to the +24V VCC, and the +24V VCC is connected to the G-pin of the first P-channel field effect transistor P1 through a fifteenth resistor R15; the G-pin of the first P-channel field effect transistor P1 is further connected to the emitter of the second PNP transistor Q2 through a sixteenth resistor R16; the S-pin of the first P-channel field effect transistor P1 is connected to the +24V VCC, the D-pin of the first P-channel field effect transistor P1 is connected to that of the second N-channel field effect transistor P2 and serves as a solder pad interface A; the S-pin of the second N-channel field effect transistor P2 is connected to the ground terminal GND, the G-pin of the second N-channel field effect transistor P2 is connected to one end of the a fifth resistor R5, and the other end of the fifth resistor R5 serves as a PWM interface I and is connected to another PWM control port of the CPU (1); the S-pin of the fifth N-channel field effect transistor P5 is connected to the ground terminal GND, one G-pin end of the fifth N-channel field effect transistor P5 is connected to a fourteenth resistor R14, and the other end of the fourteenth resistor R14 serves as a PWM interface I and is connected to a PWM control port of the CPU (1); the D-pin of the fifth N-channel field effect transistor P5 is connected to the base of the fourth PNP transistor Q4 through a twelfth resistor R12, the collector of the fourth PNP transistor Q4 is connected to the ground terminal GND through a seventeenth resistor R17, and the emitter of the fourth PNP transistor Q4 is connected to that of the third NPN transistor Q3; the base of the third NPN transistor Q3 is connected to that of the fourth PNP transistor Q4, the collector of the third NPN transistor Q3 is connected to the +24V VCC, and the +24V VCC is connected to the G-pin of the third P-channel field effect transistor P3 through a tenth resistor R10; the G-pin of the third P-channel field effect transistor P3 is further connected to the emitter of the fourth PNP transistor Q4 through an eleventh resistor R11, the S-pin of the third P-channel field effect transistor P3 is connected to the +24V VCC, the D-pin of the third P-channel field effect transistor P3 is connected to that of the fourth N-channel field effect transistor P4 and serves as a solder pad interface B; the S-pin of the fourth N-channel field effect transistor P4 is connected to the ground terminal GND; the G-pin of the fourth N-channel field effect transistor P4 is connected to one end of an eighth resistor R8; and the other end of the eighth resistor R8 serves as a PWM interface II and is connected to another PWM control port of the CPU (1).

2. The floor lamp control circuit of claim 1 wherein a first resistor R1 is connected between the base of the second PNP transistor Q2 and the collector of the first NPN transistor Q1, a sixth resistor R6 is connected between the G-pin and S-pin of the second N-channel field effect transistor P2, a twelfth resistor R12 is connected between the base of the fourth PNP transistor Q4 and the collector of the third NPN transistor Q3, and a ninth resistor R9 is connected between the G-pin and S-pin of the fourth N-channel field effect transistor P4.

* * * * *